United States Patent
Lengsfeld et al.

(10) Patent No.: US 11,415,985 B2
(45) Date of Patent: Aug. 16, 2022

(54) METHOD AND DEVICE FOR ASCERTAINING A STATE OF A VEHICLE LIGHT OF A VEHICLE

(71) Applicant: Robert Bosch GmbH, Stuttgart (DE)

(72) Inventors: Alexander Lengsfeld, Hildesheim (DE); Esther Dietrich, Ennigerloh (DE); Marcel Brueckner, Sunnyvale, CA (US); Philip Lenz, Holle (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 16/658,828

(22) Filed: Oct. 21, 2019

(65) Prior Publication Data
US 2020/0125095 A1 Apr. 23, 2020

(30) Foreign Application Priority Data

Oct. 22, 2018 (DE) .......................... 102018218015.6

(51) Int. Cl.
| | |
|---|---|
| *G05D 1/00* | (2006.01) |
| *G05D 1/02* | (2020.01) |
| *B60Q 1/14* | (2006.01) |
| *G06V 20/56* | (2022.01) |

(52) U.S. Cl.
CPC ............ *G05D 1/0088* (2013.01); *B60Q 1/14* (2013.01); *G05D 1/0246* (2013.01); *G06V 20/56* (2022.01); *B60R 2300/80* (2013.01)

(58) Field of Classification Search
CPC .............. G05D 1/0088; G05D 1/0246; G06K 9/00791; G06K 9/6267; G06K 9/00825; B60R 2300/80
See application file for complete search history.

(56) References Cited

U.S. PATENT DOCUMENTS

| | | | |
|---|---|---|---|
| 2017/0039435 A1 | 2/2017 | Ogale et al. | |
| 2017/0364758 A1* | 12/2017 | Minster | G06K 9/00825 |
| 2019/0087672 A1* | 3/2019 | Wang | G06K 9/6288 |

(Continued)

FOREIGN PATENT DOCUMENTS

WO    WO-2019184825 A1 *  10/2019  ........... G06K 9/3233

OTHER PUBLICATIONS

Yoneda et al.; Convolutional Neural Network Based Vehicle Turn Signal Recognition; ICIIBMS 2017, Track:2 Artificial Intelligence, Robotics and Human-Computer Interaction; Okinawa, Japan (Year: 2017).*

(Continued)

*Primary Examiner* — Michael J Zanelli
(74) *Attorney, Agent, or Firm* — Norton Rose Fulbright US LLP; Gerard Messina

(57) ABSTRACT

A method is described for ascertaining a state of a vehicle light of a vehicle. The method includes a step of reading in and a step of evaluating. In the step of reading in, an image signal is read in that includes a camera image including a vehicle area of a detected vehicle. In the step of evaluating, the image signal is evaluated by using an artificial teachable model, in particular an artificial neural network. Here, at least two state categories, each representing a state of the vehicle light of the vehicle, are differentiated. That state category is ascertained as the evaluation result which represents the instantaneous state of the vehicle light of the vehicle.

19 Claims, 10 Drawing Sheets

(56) References Cited

U.S. PATENT DOCUMENTS

2019/0092318 A1* 3/2019 Mei .................... G06K 9/00825
2019/0315274 A1* 10/2019 Mehdi ............... B60W 30/0956
2019/0370574 A1* 12/2019 Wang ....................... G06N 3/08
2020/0234066 A1* 7/2020 Lee ...................... G05D 1/0088

OTHER PUBLICATIONS

Hsu et al.; Learning to Tell Brake and Turn Signals in Videos Using CNN-LSTM Structure; 2017 IEEE 20th Intl. Conf. on Intelligent Transportation Systems (ITSC); Oct. 16-19, 2017 (Year: 2017).*

* cited by examiner

METHOD AND DEVICE FOR ASCERTAINING A STATE OF A VEHICLE LIGHT OF A VEHICLE

CROSS REFERENCE

The present application claims the benefit under 35 U.S.C. § 119 of German Patent Application No. DE 102018218015.6 filed on Oct. 22, 2018, which is expressly incorporated herein by reference in its entirety.

FIELD

The present invention is directed to a device or a method for ascertaining a state of a vehicle light of a vehicle. The present invention is also directed to a computer program.

BACKGROUND INFORMATION

It is possible to detect whether a taillight of a preceding vehicle is blinking. For this purpose, a frequency examination of an intensity profile of the taillight may take place by using an image signal of the taillight of the preceding vehicle and it is possible to ascertain a probability at which the taillight is active, i.e., blinking.

US Patent Application Publication No. US 2017/039,435 A1 describe a method for detecting a blinking of a preceding vehicle.

SUMMARY

Against this background, a method and a device for ascertaining a state of a vehicle light of a vehicle as well as a training of an artificial teachable model, in particular of an artificial neural network, are provided with the aid of the approach presented here. The measures described herein make advantageous refinements and improvements of the device possible.

With the aid of the present invention, it is possible to detect the state of the vehicle lights of the vehicle by using an image of a back view of a preceding vehicle or it is also possible to detect the state of the vehicle lights of the vehicle by using an image of a front view of an oncoming vehicle. A brake application may also be detected in addition to a blinking. A shape and combination of taillights may, for example, be classified (braking, hazard warning flasher, braking and blinking, etc.). The taillight is to only light up at least once to be detected. A blinking (i.e., a repeated or cyclic switching on/off of the light) is not necessarily required. In this case, neither a separate localization nor a separate tracking of the individual vehicle lights is advantageously required. The state of the vehicle lights may be detected independently of a design and an employed lighting type, whereby vehicle lights in the form of pulsed light emitting diodes may also be detected, for example. In addition, a partially defective vehicle light may also be detected. Blinking vehicle lights may be advantageously detected independently of a blinking frequency.

An example method for ascertaining a state of a vehicle light of a vehicle is provided. The method includes a step of reading in and a step of evaluating. In the step of reading in, an image signal is read in that includes a camera image including a vehicle area of a detected vehicle. In the step of evaluating, the image signal is evaluated by using an artificial teachable model, in particular an artificial neural network. Here, at least two state categories are differentiated, each representing a state of the vehicle light of the vehicle. As the evaluation result, that state category is ascertained which represents the instantaneous state of the vehicle light of the vehicle.

The vehicle may be a farm vehicle or a commercial vehicle or another means of transportation, which may also be designed as an automotive vehicle having an automated driving mode. The vehicle light may be understood to mean a vehicle light, for example a taillight of the vehicle, i.e., a turn-signal light, a braking light, a back-up light, or a headlight, such as a front light or a rear fog light of the vehicle. The image signal may be read in via an interface to a sensor device of the vehicle. The image signal may include an enveloping body, a so-called bounding box, of the vehicle area of the detected vehicle. The vehicle area may be a vehicle rear or a vehicle front. The artificial teachable model may be understood to mean a model including a teachable structure that may be used to recognize patterns in a read-in (image) signal. The artificial teachable model may also be referred to as a teachable model for the purpose of simplification. For example, the (artificial) teachable model may be designed as an artificial neural network or a single-layer, multi-layer or recurrent network. Alternatively, the step of evaluating may also take place by using another sequential machine learning method or an artificially teachable model, such as a Hidden Markov Model (HMM), a Conditional Random Field (CRF), or any arbitrary recurrent neural network (RRN). These learning methods or models may then also be understood as an artificially teachable model or as a training of an artificially teachable model. The at least two state categories each representing a state of the vehicle light of the vehicle may represent an operating mode of the vehicle light, such as on or off, as the state, for example, and additionally or alternatively a type of the vehicle light, i.e., an identification of the light type. "Left-hand turn signal on" or "taillight on" or "back-up light off" may then be ascertained, for example, as the instantaneous state of the vehicle light.

According to one specific embodiment, at least two further state categories each representing a state of a further vehicle light of the vehicle may be differentiated in the step of evaluating. As the evaluation result, that further state category may be ascertained in this case that represents the instantaneous state of the further vehicle light of the vehicle. This is advantageous for the purpose of ascertaining the instantaneous state of several vehicle lights with the aid of the method. For example, the instantaneous state of all vehicle lights visible in the vehicle area, for example of all taillights, may thus be ascertained, whereby it is possible to differentiate between different lighting states, which may also include several vehicle lights. It is thus advantageously possible to differentiate between a blinking from a brake application and an emergency brake application with the aid of the method.

In the step of reading in, the image signal, which includes at least two image subsignals, may be read in according to one specific embodiment. The at least two image subsignals may each include different pieces of color information of the image signal. The step of evaluating may then be carried out by using the at least two image subsignals. Different image areas, different color channels of the same image area, or color histograms of the image area having a subdivision of the image area may be included, for example, as different pieces of color information.

In addition, the at least two image subsignals, each of which represent the vehicle area in a different spectral range, may be read in according to one specific embodiment in the step of reading in. This is advantageous with regard to a significant contrasting of the vehicle lights. Additionally or alternatively, the at least two image subsignals may represent different vehicle subareas of the detected vehicle in the step of reading in. Color histograms of image areas of a vehicle silhouette or of a bounding box of the vehicle may, for example, be used as the vehicle subareas. This is advantageous with regard to detecting spatial information of the image signal.

According to one specific embodiment, the step of evaluating may be carried out by using a fed back teachable model, in particular a fed back neural network, as the artificial neural network. For this purpose, the fed back teachable model may, for example, have a so-called long short-term memory (LSTM) or a gated recurrent unit (GRU).

According to one specific embodiment, a detection signal may also be read in in the step of reading in. The detection signal may represent a first-time detection of the vehicle. In the step of evaluating, the fed back teachable model may be put into a predetermined state as a response to the detection signal. For this purpose, the fed back teachable model may be put into a base state, for example into a starting state following a completed training of the artificial teachable model. This advantageously prevents the values of preceding methods for ascertaining the state of the vehicle light of the vehicle from influencing subsequent methods.

According to one specific embodiment, the image signal may furthermore include the camera image including a vehicle area of a further detected vehicle in the step of reading in. In the step of evaluating, at least two state categories, each representing a state of a vehicle light of the further vehicle, may be differentiated. As the evaluation result, that state category may then be ascertained which represents the instantaneous state of the vehicle light of the further vehicle. It is thus advantageously possible to ascertain the state of the vehicle lights of several vehicles to be able to assess a situation in a traffic situation including several road users, for example. This may be advantageous in particular for a use in a vehicle having an automated driving mode.

When the further vehicle is detected, the step of evaluating may be carried out according to one specific embodiment to ascertain the state of the vehicle light of the further vehicle by using a further artificial teachable model, in particular a further artificial neural network. For each detected vehicle represented in the image signal, an artificial teachable model or neural network may be initialized in each case, for example, to ascertain the state of the vehicle lights of the detected vehicles.

According to one specific embodiment, the evaluation result may be additionally ascertained in the step of evaluating by using the function argumentum maximi. This is advantageous for the purpose of determining a confidence in the ascertained state of the vehicle light.

According to one specific embodiment, the method may also include a step of outputting an evaluation signal. The evaluation signal may represent the evaluation result. In addition, the evaluation signal may be output as a visual and, additionally or alternatively, as an audible signal. The evaluation signal may be provided via an interface to a display device of the vehicle, for example. To display the instantaneous state of the vehicle light of the vehicle, the camera image may be displayed, for example, including the detected vehicle or bounding box of the vehicle on the display device of the vehicle and the state of the vehicle light may, for example, be displayed in color or symbolically, for example in the form of a colored arrow at one point of an active vehicle light of the displayed vehicle, in order to visualize a blinking operation or a braking operation detected with the aid of the ascertained state of the vehicle light, for example. Advantageously, a driver of the vehicle may thus be provided with the evaluation result in a clear and time-saving manner.

This approach is additionally used to present a method for teaching an artificial teachable model, in particular an artificial neural network, to evaluate an image signal. The method includes a step of reading in and a step of training. In the step of reading in, an image signal and a target signal are read in. The image signal includes a camera image including a vehicle area of a detected vehicle. The target signal represents a state category of a vehicle light of the vehicle. The state category corresponds to a state of the vehicle light displayed in the image signal.

In the step of training, the artificial teachable model, in particular the artificial neural network is trained in such a way that the artificial teachable model detects the state category as a response to the image signal. Here, the artificial teachable model may be trained to differentiate at least between two state categories, each representing a state of the vehicle light of the vehicle.

The methods presented here may, for example, be implemented in a software or hardware or in a mix of software and hardware, such as in a control unit.

The approach presented here furthermore provides a device which is designed to carry out, control or implement in appropriate devices the steps of one variant of a method presented here. This embodiment variant of the present invention in the form of a device also makes it possible to achieve the object underlying the present invention rapidly and efficiently.

For this purpose, the device may include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The processing unit may be, for example, a signal processor, a microcontroller, or the like, the memory unit potentially being a flash memory, an EEPROM, or a magnetic memory unit. The communication interface may be designed to read in or output data in a wireless and/or wired manner, by means of which a communication interface, which is able to read in or output data in a wired manner, is able to read in these data electrically or optically, for example, from a corresponding data transmission line or output these data into a corresponding data transmission line.

In the present case, a device may be understood to mean an electrical device that processes sensor signals and outputs control and/or data signals as a function thereof. The device may have an interface which may be designed as hard- and/or software. In the case of a hardware design, the interfaces may, for example, be a part of a so-called system ASIC, which includes various functions of the device. It is, however, also possible that the interfaces are independent, integrated circuits or are at least partially made up of discrete components. In the case of a software design, the interfaces may be software modules that are present on a microcontroller in addition to other software modules, for example.

A computer program product or a computer program having program code, which may be stored on a machine-readable carrier or a memory medium, such as a semiconductor memory, a hard disk memory, or an optical memory, is also advantageous and is used to carry out, implement and/or control the steps of the method according to one of the specific embodiments described above, in particular when the program product is run on a computer or a device.

Exemplary embodiments of the present invention are illustrated in the figures and elucidated in greater detail below.

DETAILED DESCRIPTION FOR EXAMPLE EMBODIMENTS

Figure 1:
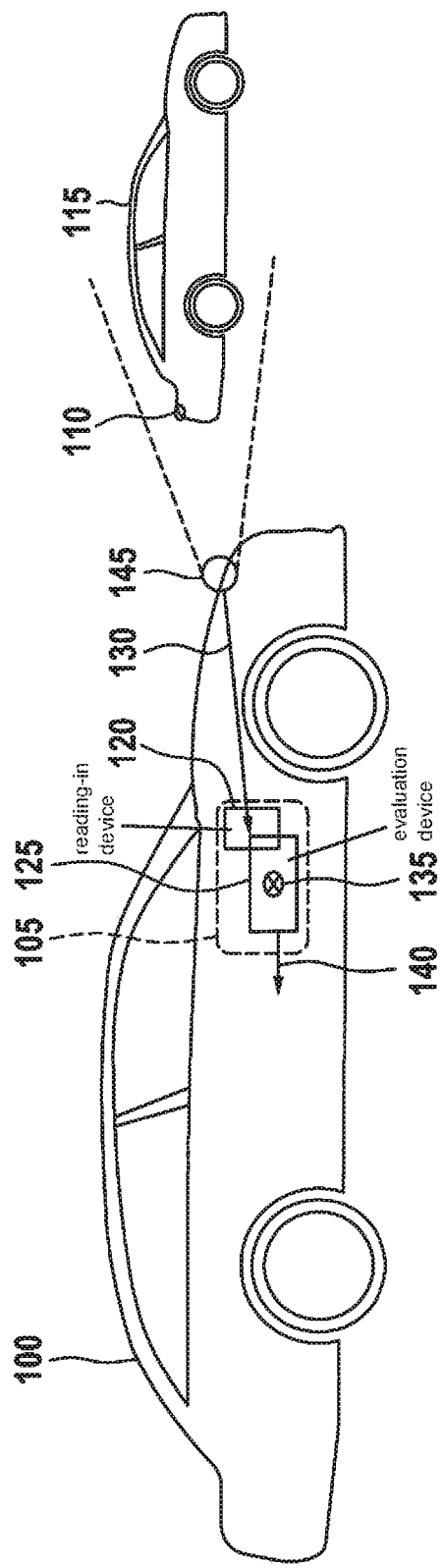
FIG. 1 shows a schematic illustration of a vehicle including a device for ascertaining a state of a vehicle light of the vehicle according to one exemplary embodiment.

In the description below of advantageous exemplary embodiments of the present invention, the elements which are illustrated in the various figures and appear to be similar are identified with identical or similar reference numerals; a repetitive description of these elements is dispensed with.

FIG. 1 shows a schematic illustration of a first vehicle 100 including a device 105 for ascertaining a state of a vehicle light 110 of a second vehicle 115 according to one exemplary embodiment. Device 105 includes a reading-in device 120 and an evaluation device 125. Reading-in device 120 is designed to read in an image signal 130. Image signal 130 includes a camera image including a vehicle area of a detected vehicle, second vehicle 115 shown here. Evaluation device 125 is designed to evaluate image signal 130 by using an artificial teachable model 135. In the course of the description, the present invention is described for the sake of simplicity by way of example of an artificial neural network as the artificially teachable model, those skilled in the art also undoubtedly recognizing as a result of the preceding embodiments that another artificially teachable model, such as the Hidden Markov Model or the like, may be used instead of or in addition to the artificial neural model. For the sake of simplicity, the artificial neural network is therefore also to be understood or described as representative of or synonymous with the artificially teachable model under reference numeral 135, the structure of the particular model as an artificial neural network or as another implementation of the artificial teachable model being of subordinate importance to the description and understanding of the present invention presented here.

Here, at least two state categories are differentiated, each representing a state of vehicle light 110 of detected vehicle 115. As the evaluation result, that state category is ascertained which represents the instantaneous state of vehicle light 110 of detected vehicle 115.

According to the exemplary embodiment shown here, the evaluation result is provided in the form of an evaluation signal 140. Image signal 130 is provided by way of example by a surroundings detection device 145 of vehicle 100. Vehicle light 110 of detected vehicle 115 is designed as a taillight by way of example. It is advantageously possible with the aid of device 105 shown here to ascertain the state of different light types. It is thus possible to not only detect a blinking of preceding vehicle 115, for example, but also a braking operation or an emergency brake application. This is possible, since device 105 shown here does without an intensity contemplation of vehicle light 110 followed by a Fourier transform and without a frequency analysis for the purpose of detecting a standard turn signal. Here, neither an exact localization of a position of vehicle light 110 nor a separate tracking of individual vehicle lights 110 is necessary. The use of image signal 130 makes it possible to ascertain the state of vehicle light 110 independently of a design and a used light type, such as taillights in the form of pulsed light emitting diodes. In addition, device 105 is also designed to detect a partially defective vehicle light 110 or a rapidly blinking turn signal as vehicle light 110 to ascertain the instantaneous state of vehicle light 110 of detected vehicle 115. Device 105 is employable day and night. In addition, a buffering of preceding camera images or image patches of image signal 130 is not necessary, for example to be able to compute differential images, which saves costs in particular when using an application-specific integrated circuit for device 105.

Figure 2:
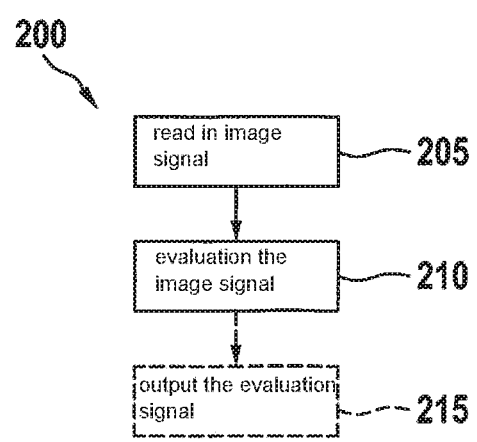
FIG. 2 shows a flow chart of a method for ascertaining a state of a vehicle light of a vehicle according to one exemplary embodiment.

FIG. 2 shows a flow chart of a method 200 for ascertaining a state of a vehicle light of a vehicle according to one exemplary embodiment. Method 200 includes at least a step 205 of reading in and a step 210 of evaluating. In step 205 of reading in, an image signal is read in that includes a camera image including a vehicle area of a detected vehicle. In step 210 of evaluating, the image signal is evaluated by using an artificial neural network. Here, at least two state categories are differentiated each representing a state of the vehicle light of the vehicle. As the evaluation result, that state category is ascertained which represents the instantaneous state of the vehicle light of the vehicle.

According to one exemplary embodiment, method 200 additionally includes a step 215 of outputting an evaluation signal. The evaluation signal represents the evaluation result of step 210 of evaluating. The evaluation signal is output as a visual and, additionally or alternatively, as an audible signal. This is shown by way of example with reference to subsequent FIGS. 6 through 8.

Figure 3:
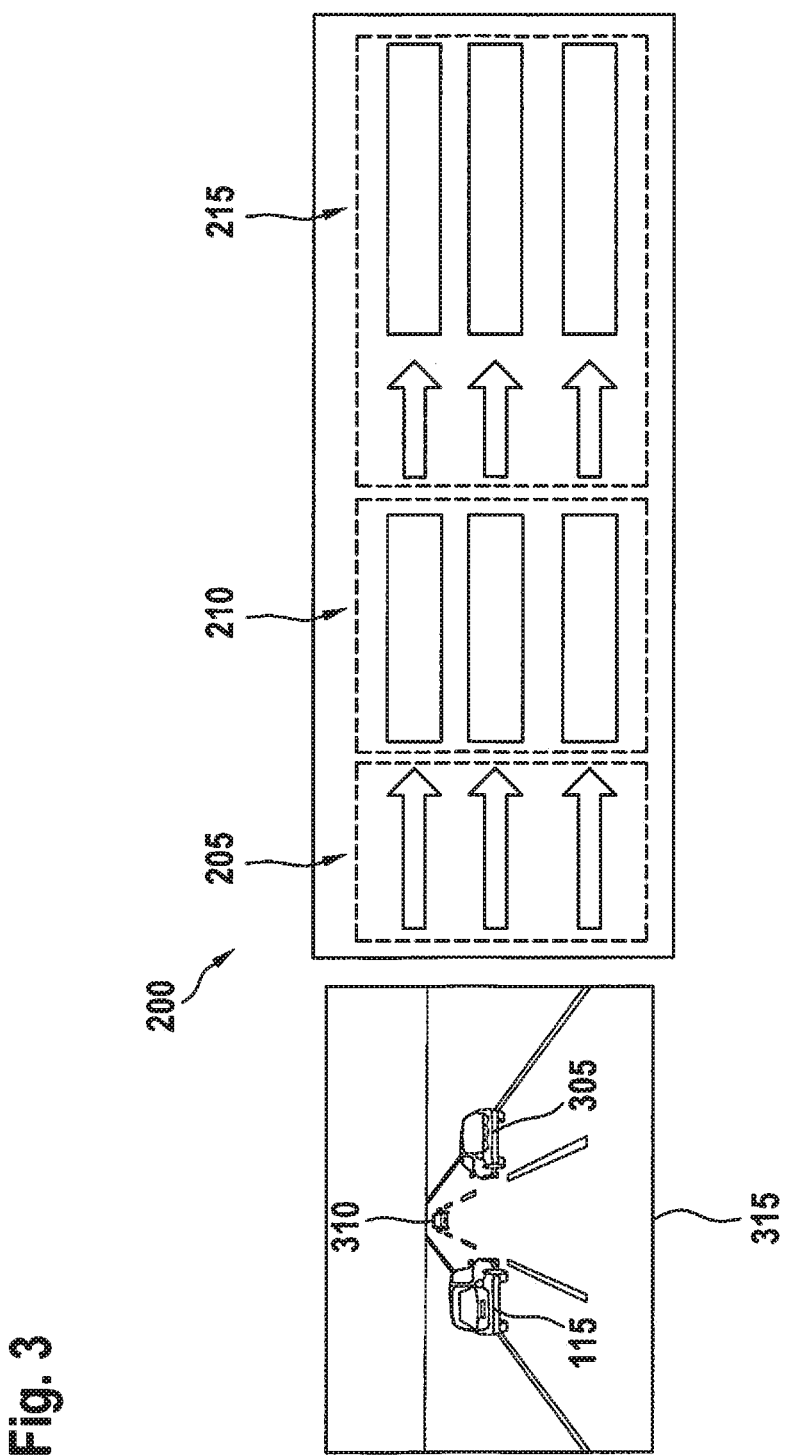
FIG. 3 shows a flow chart of a method for ascertaining a state of the vehicle lights of several vehicles according to one exemplary embodiment.

FIG. 3 shows a flow chart of a method 200 for ascertaining a state of the vehicle lights of several vehicles 115, 305, 310 according to one exemplary embodiment. A sequence of a vehicle light classification for several vehicles 115, 305, 310 is shown. Method 200 is carried out in substeps to ascertain the state of the vehicle lights of several vehicles 115, 305, 310. According to one exemplary embodiment, the image signal includes in step 205 of reading in a camera image 315 including the vehicle area of detected vehicle 115 and including a vehicle area of a further detected vehicle 305. Here, camera image 315 includes by way of example a vehicle area of a third detected vehicle 310. To evaluate the image signal including the three detected vehicles 115, 305, 310, at least two state categories each representing a state of a vehicle light of further vehicle 305, 310 are differentiated for every detected vehicle 115, 305, 310 in step 210 of evaluating. As the evaluation result, that state category is ascertained which represents the instantaneous state of the vehicle light of further vehicle 305, 310.

According to the exemplary embodiment shown here, step 210 of evaluating is carried out for every further detected vehicle 305, 310 by using a further artificial neuronal network. For this purpose, step 210 is carried out in substeps for every detected vehicle 115, 305, 310. Camera image 315 is provided here by way of example as a bounding box of vehicles 115, 305, 310. For every detected vehicle 115, 305, 310 and thus for every bounding box of vehicles 115, 305, 310, an artificial neural network is initialized in each case. In the case of the three vehicles 115, 305, 310 shown here by way of example, three artificial neural networks thus run in parallel, one vehicle being contemplated by one artificial neural network in each case to ascertain the state of the vehicle lights. The number of the maximally detected vehicles is arbitrarily establishable in this case, corresponding to a number of artificial neural networks.

In addition, optional step 215 of outputting the evaluation signal is carried out subsequently to ascertaining the state of the vehicle lights of vehicles 115, 305, 310. The evaluation result of the substeps of step 210 of evaluating is output in three substeps in each case.

Figure 4:
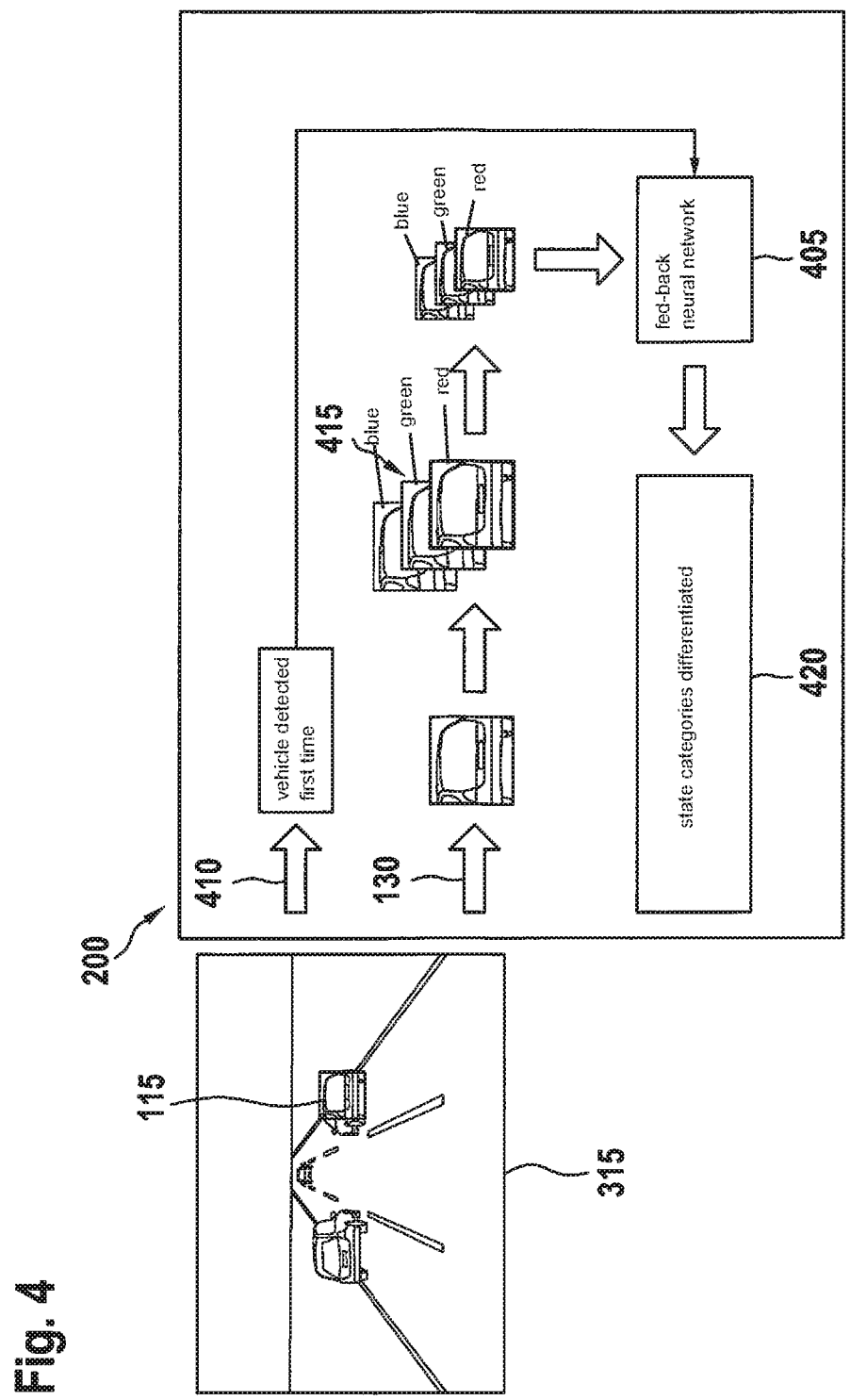
FIGS. 4 and 5 each show a schematic illustration of a method for ascertaining a state of a vehicle light of a vehicle according to one exemplary embodiment.

FIG. 4 shows a schematic illustration of a method 200 for ascertaining a state of a vehicle light of a vehicle 115 according to one exemplary embodiment. The ascertaining of the state of the vehicle light of vehicle 115 is shown on the basis of the image areas of camera image 315. Camera image 315 shows here a vehicle rear of detected vehicle 115 by way of example.

The step of evaluating is carried out according to the exemplary embodiment shown here by using a fed back neural network 405 as the artificial neural network. The artificial neural network includes here at least one long short-term memory layer (LSTM layer) as the fed back neural element.

In addition, a detection signal 410 is read in in the step of reading in according to the exemplary embodiment shown here. Detection signal 410 represents a first-time detection of vehicle 115. It is thus checked whether vehicle 115 is detected for the first time. In the step of evaluating, fed back neural network 405 is then put into a predetermined state as a response to detection signal 410. For this purpose, fed back neural network 405 is reset to a base state. Fed back neural network 405 is put into a starting state, for example, following a completed training of the artificial neural network.

According to the exemplary embodiment shown here, image signal 130 has at least two image subsignals 415 in the step of reading in. Each of the at least two image subsignals 415 includes different pieces of color information of image signal 130. The step of evaluating is carried out in this case by using the at least two image subsignals 415.

Each of the at least two image subsignals 415 represents the vehicle area of vehicle 115 in a different spectral range. Here, image signal 130 has three image subsignals 415 by way of example, each of which represents a different color channel of the vehicle area. Additionally or alternatively, the at least two image subsignals 415 represent different vehicle subareas of detected vehicle 115, as is shown based on FIG. 5 below.

In the step of evaluating, at least two state categories 420 are differentiated each representing a state of the vehicle light of vehicle 115. According to one exemplary embodiment, at least two further state categories 420 are differentiated each representing a state of a further vehicle light of the vehicle. Those state categories 420 are ascertained in this case that represent the instantaneous state of the vehicle light and of the further vehicle light in each case as evaluation results. According to the exemplary embodiment shown here, detected vehicle 115 has six different vehicle light types by way of example: one left-hand turn signal, one right-hand turn signal, one brake light, one back-up light, one taillight, and one fog light. In the step of evaluating, it is correspondingly differentiated between six different vehicle light types. In addition, a differentiation is made with regard to the operating mode of the vehicle light (vehicle light on or off) in each case. Thus, twelve state categories 420 are differentiated, each representing a state of the vehicle light of the vehicle: left-hand turn signal on, left-hand turn signal off, right-hand turn signal on, right-hand turn signal off, brake light on, brake light off, back-up light on, back-up light off, taillight on, rear taillight off, fog light on, fog light off. The evaluation result may for example include state category 420 of all vehicle lights. Advantageously, a classification of the state of all rear lights of vehicle 115 is thus possible with the aid of method 200 shown here and thus with the aid of one single method 200. It is thus possible with the aid of method 200 to differentiate between different rear light states, such as a blinking, a braking, or an emergency brake application. An output of the evaluation result correspondingly includes the state of all vehicle lights of vehicle 115 in the detected vehicle area of vehicle 115, for example the state of all rear lights.

According to one exemplary embodiment, the classification result of the vehicle lights of fed back neural network 405 is determined via an argmax, i.e., by using the function argumentum maximi, whereby for each ascertained state of state categories 420, a confidence is ascertained, which is output optionally together with the evaluation result.

Figure 5:
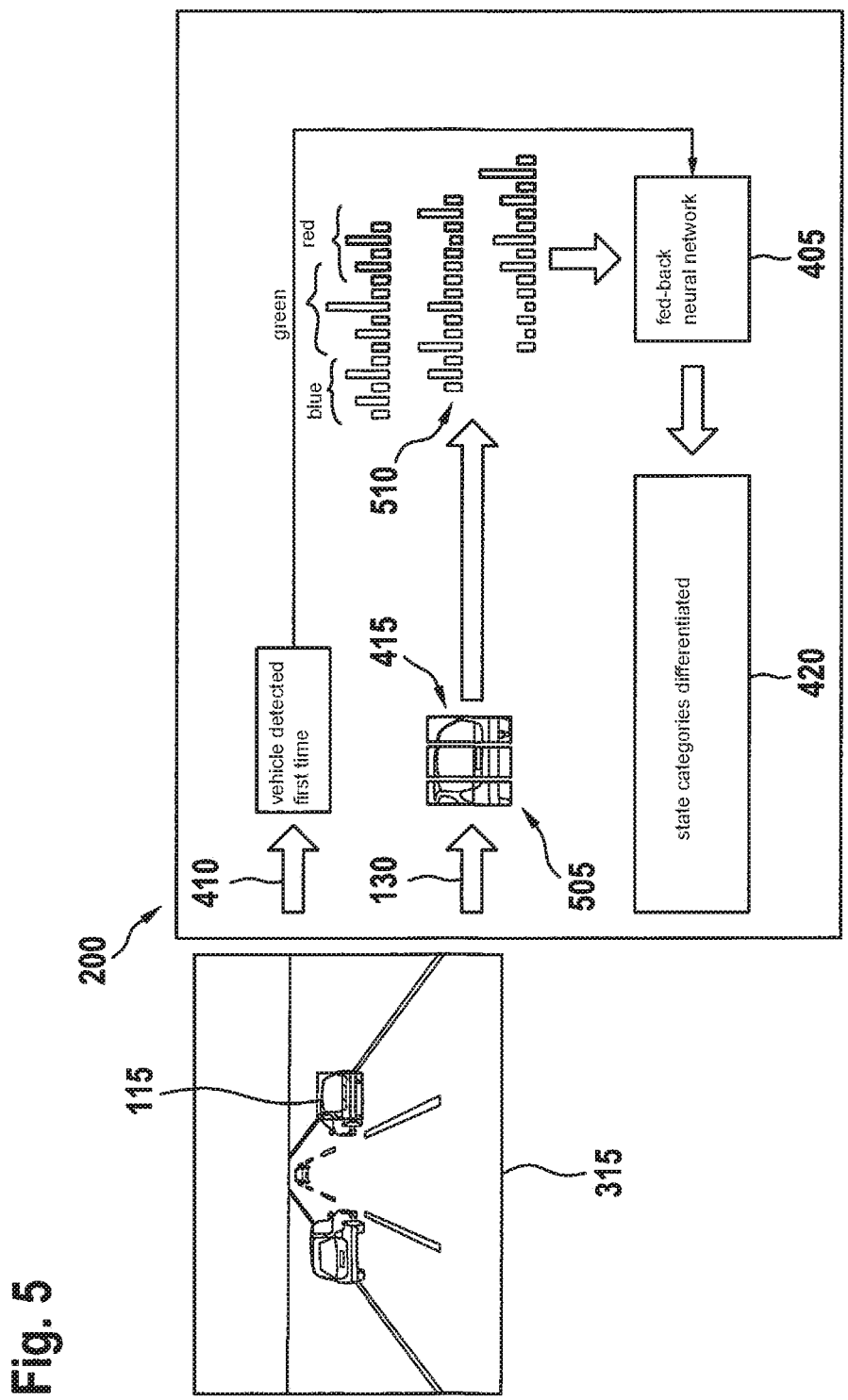

FIG. 5 shows a schematic illustration of a method 200 for ascertaining a state of a vehicle light of a vehicle according to one exemplary embodiment. The sequence of method 200 shown here is similar to the exemplary embodiment described with reference to FIG. 4, including camera image 315 including detected vehicle 115, detection signal 410, fed back neural network 405, and the twelve state categories of the vehicle lights of vehicle 115.

According to the exemplary embodiment shown here, the at least two image subsignals 415 read in via image signal 130 represent in this case, however, different vehicle subareas 505 of detected vehicle 115. For this purpose, the vehicle area of vehicle 115 detected via camera image 315 is divided into several image areas. Here, the vehicle area is divided by way of example into three columns, corresponding to the light positions (right-hand, center, left-hand) of vehicle 115. The three vehicle subareas corresponding to image subsignals 415 are each represented in this case by three color histograms 510 in three different colors. Nine color histograms 510 are correspondingly read in as the input for fed back neural network 405. The basis of color histograms 510 are the image areas, vehicle subareas 505, of a vehicle silhouette or bounding box of vehicle 115, this basis being subdivided into several image parts, three vehicle subareas 505 in this case by way of example, for the purpose of a spatial piece of information of the vehicle area.

Figure 6:
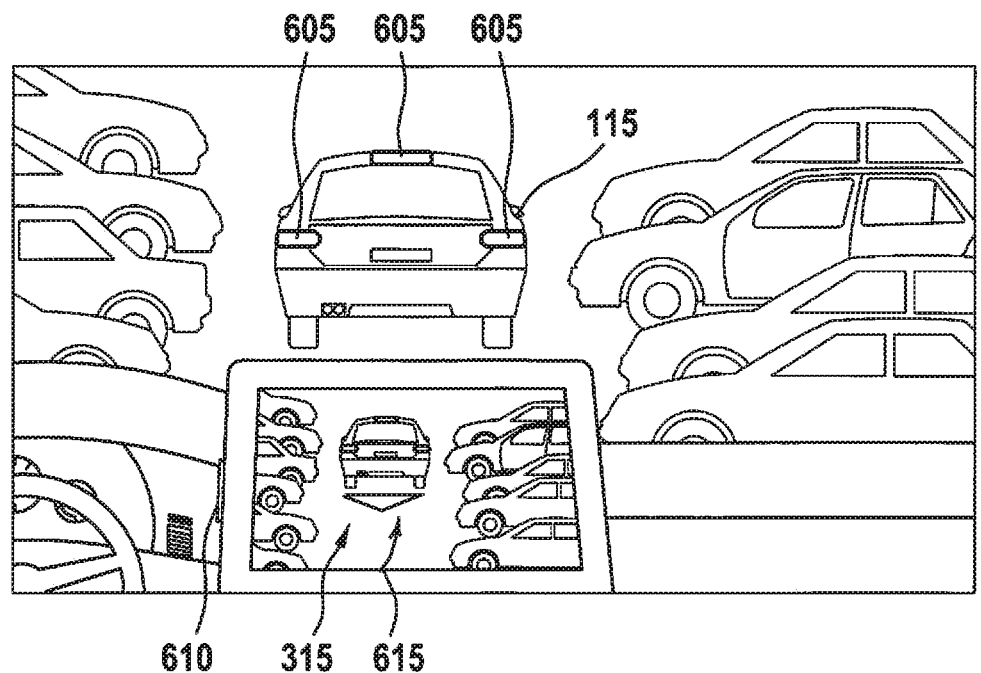
FIGS. 6 through 8 each show a schematic illustration of displaying a state of a vehicle light of a vehicle according to one exemplary embodiment.

FIG. 6 shows a schematic illustration of a display of a state of a vehicle light 605 of a vehicle 115 according to one exemplary embodiment. It is a view from the passenger compartment of the first vehicle from a viewing direction of a driver of the first vehicle onto detected vehicle 115. In the passenger compartment of the first vehicle, a display device 610 is situated, on which camera image 315 of the image signal and thus the detection of a vehicle rear of vehicle 115 is displayed as a bounding box by way of example.

According to the exemplary embodiment shown here, the evaluation result of the method for ascertaining the state of vehicle light 605 of vehicle 115 is output in the form of an evaluation signal 615. Evaluation signal 615 represents the evaluation result and is output on display device 610 as a visual signal in this case. Additionally or alternatively, evaluation signal 615 may also be output as an audible signal. Detected vehicle 115 is braking in the exemplary embodiment shown here, i.e., three vehicle lights 615 of vehicle 115 are active by way of example. In addition to a flashing of vehicle lights 605, which is also detectable on display device 610, the braking of vehicle 115 is visually signaled with the aid of evaluation signal 615 by using a red arrow pointing downward at the bounding box of the vehicle rear of the vehicle displayed on display device 610 by way of example in this case.

Figure 7:
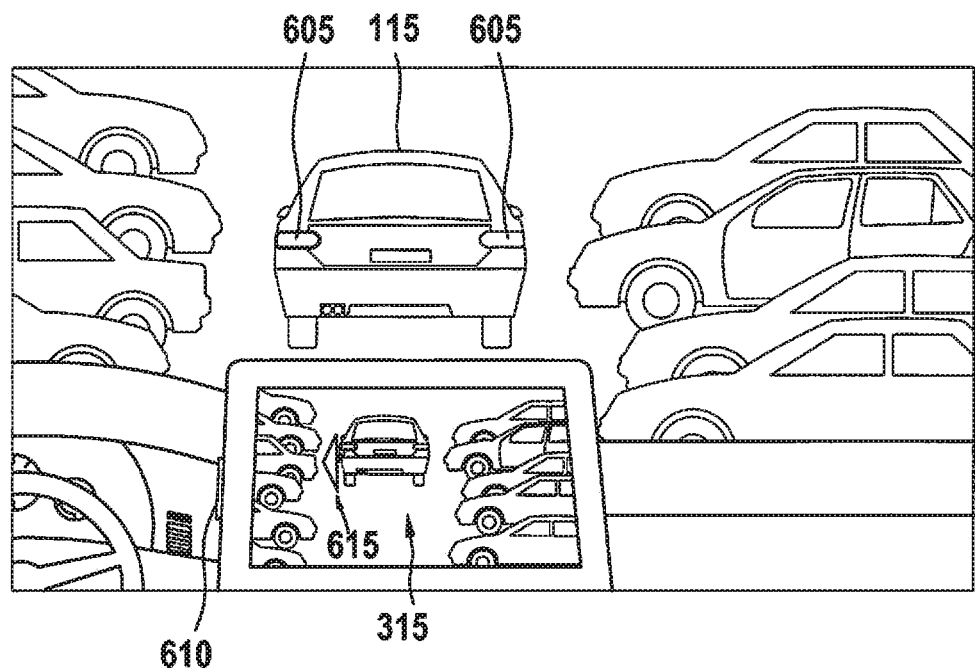

FIG. 7 shows a schematic illustration of a display of a state of a vehicle light 605 of a vehicle 115 according to one exemplary embodiment. The exemplary embodiment shown here is similar to the exemplary embodiment described with reference to FIG. 6, having another state of vehicle lights 605 of detected vehicle 115, which is not braking but blinking with the left turn signal in this case. This is shown here by way of example by displaying evaluation signal 615 on display device 610 in the form of camera image 315 with the bounding box of the vehicle area of the detected vehicle. To visualize the blinking operation, an orange arrow directed into the blinking direction is shown here by way of example at the bounding box of the vehicle rear.

Figure 8:
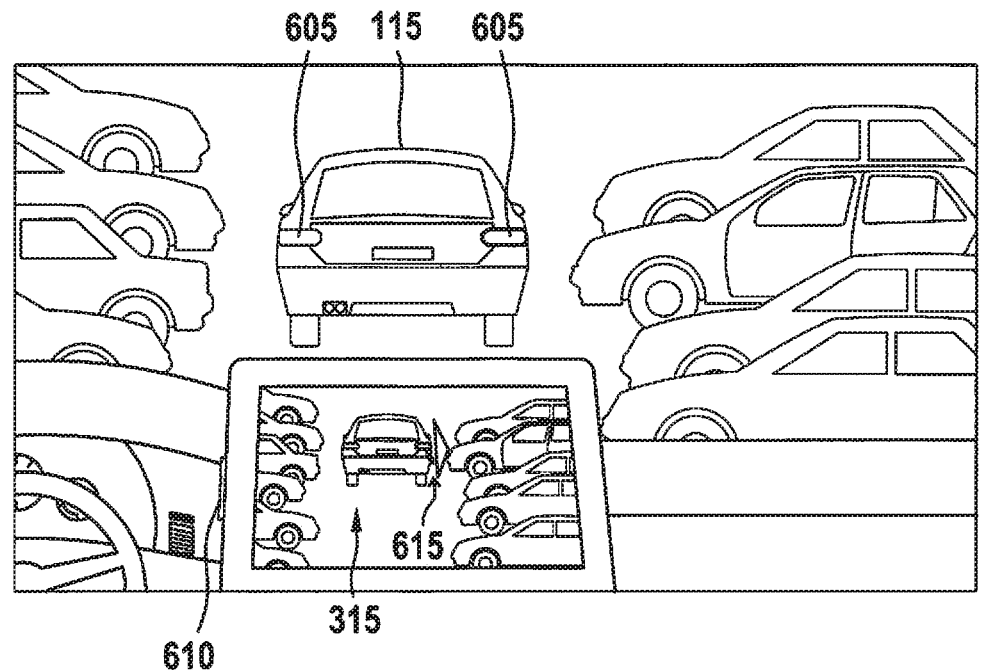

FIG. 8 shows a schematic illustration of a display of a state of a vehicle light 605 of a vehicle 115 according to one exemplary embodiment. The exemplary embodiment shown here is similar to the exemplary embodiments described with reference to FIG. 6 and FIG. 7, detected vehicle 115 using the right turn signal in this case. This is shown here by way of example by displaying evaluation signal 615 on display device 610 in the form of camera image 315 with the bounding box of the vehicle area of the detected vehicle, using an orange arrow pointing to the right correspondingly to the blinking direction for the purpose of visualizing the ascertained state of vehicle lights 605 of detected vehicle 115.

Figure 9:
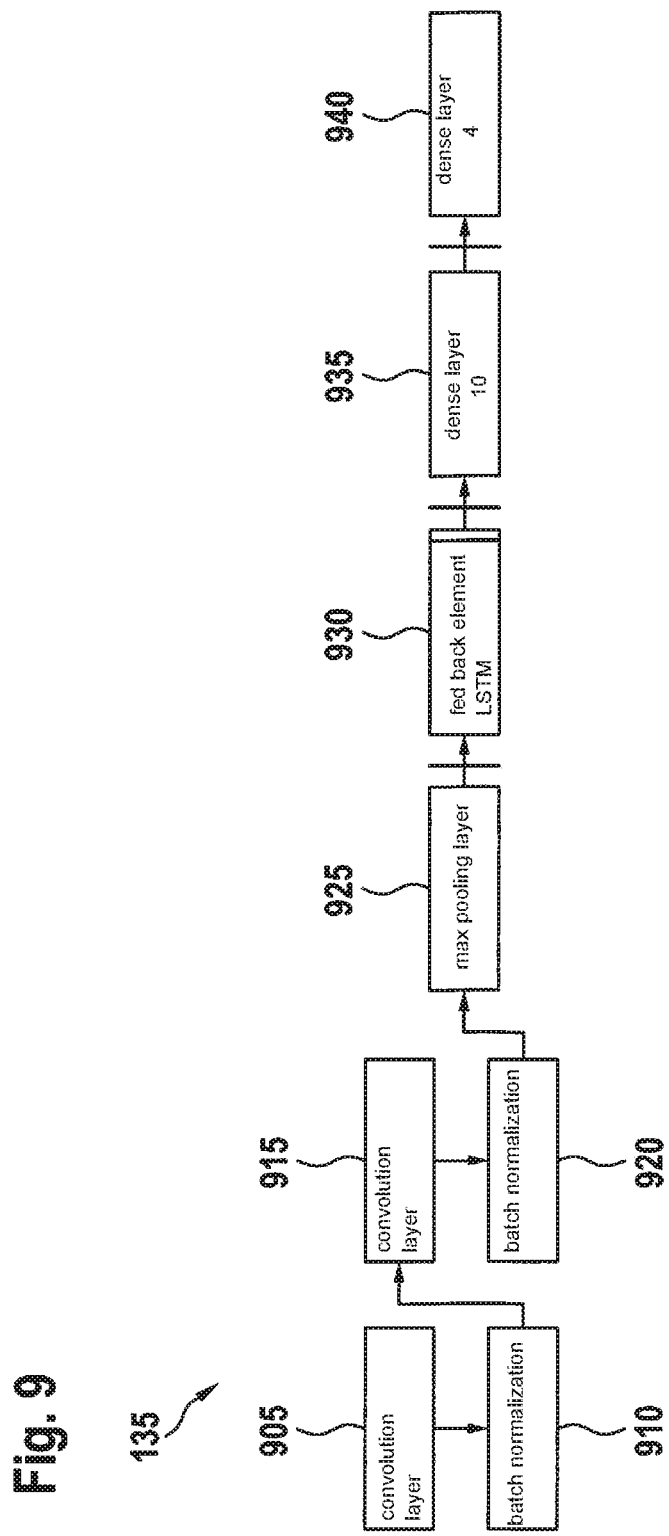
FIGS. 9 and 10 each show a schematic illustration of an artificial teachable model according to one exemplary embodiment.

FIG. 9 shows a schematic illustration of an artificial teachable model 135 according to one exemplary embodiment. It is an exemplary architecture to differentiate between four state categories. As the input for artificial teachable model 135 or the neural network, image patches are presumed as image signals in this case as described with reference to FIG. 4. A convolutional neural network is shown, also referred to as a convolving neural network. The artificial neural network as teachable model 135 has a convolution layer 905 in this case, including a filter 16, a 6×6 kernel size, and a stride 2. Convolution layer 905 is linked to a batch normalization 910 whose output is processed in another convolution layer 915, which is linked to another batch normalization 920, followed by a max pooling layer 925 having a 2×2 size (pool size) and a stride 2. Max pooling layer 925 has a dropout of 0.5 and is linked to a fed back element 930, an LSTM layer 10 having a dropout of 0.6 and a dropout of 0.25, followed by two fully connected layers 935 and 940, a dense layer 10 and a dense layer 4, a dropout of 0.8 taking place between layers 935 and 940.

Figure 10:
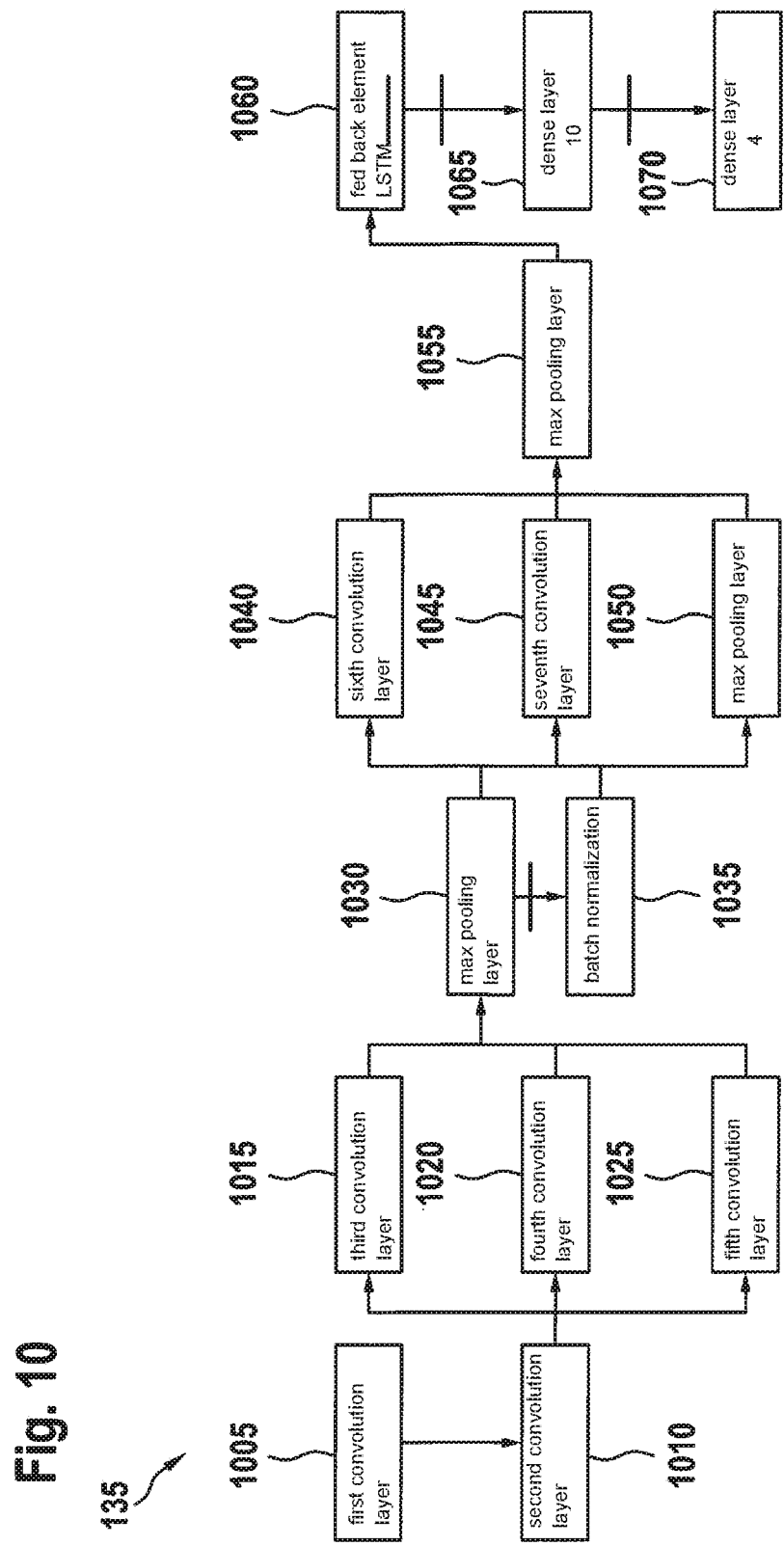

FIG. 10 shows a schematic illustration of an artificial teachable model 135 in the form of a neural network according to one exemplary embodiment. This is an exemplary architecture to differentiate between four state categories. As the input for artificial neural network 135, image patches are presumed as image signals in this case as described with reference to FIG. 4. An artificial neural network 135 is shown on the basis of the inception idea. Artificial neural network 135 has in this case a first convolution layer 1005, including a filter 32, a 3×3 kernel size, and a stride 2, which is linked to a second convolution layer 1010 including a filter 32, a 2×2 kernel size, and a stride 1. The output of second convolution layer 1010 is processed in a next layer using third convolution layer 1015, fourth convolution layer 1020, and fifth convolution layer 1025. Third convolution layer 1015 includes a filter 64, a 1×1 kernel size, and a stride 2, fourth convolution layer 1020 includes a filter 64, a 3×3 kernel size, and a stride 2, and fifth convolution layer 1025 includes a filter 64, a 5×5 kernel size 5, and a stride 2. This is followed by a max pooling layer 1030 including a 2×2 pool size and a stride 2, and a dropout of 0.6. Max pooling layer 1030 is linked to a batch normalization 1035. This is followed by a repetition of a comparable structure including a further layer together with a sixth convolution layer 1040, a seventh convolution layer 1045, and an eighth convolution layer 1050, linked to a further max pooling layer 1055 including a 2×2 pool size and a stride 2. Sixth convolution layer 1040 includes a filter 128, a 3×3 kernel size, and a stride 2, seventh convolution layer 1045 includes a filter 128, a 1×1 kernel size, and a stride 2, and eighth convolution layer 1050 includes a filter 128, a 5×5 kernel size and a stride 2. Max pooling layer 1050 is linked to a fed back element 1060, an LSTM layer 16 including a dropout of 0.6 and a dropout of 0.4, followed by two fully connected layers 1065 and 1070, a dense layer 10 and a dense layer 4, a dropout of 0.7 taking place between layers 1065 and 1070.

Figure 11:
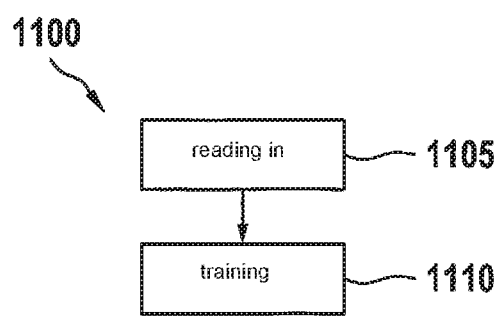
FIG. 11 shows a flow chart of a method for teaching an artificial teachable model to evaluate an image signal according to one exemplary embodiment.

FIG. 11 shows a flow chart of a method 1100 for teaching an artificial teachable model to evaluate an image signal according to one exemplary embodiment. Method 1100 includes a step 1105 of reading in and a step 1110 of training. In step 1105 of reading in, an image signal and a target signal are read in. The image signal includes a camera image including a vehicle area of a detected vehicle. The target signal represents a state category of a vehicle light of the vehicle. The state category corresponds to a state of the vehicle light displayed in the image signal. In step 1110 of training, the artificial teachable model is trained in such a way that the artificial teachable model detects the state category as a response to the image signal.

If an exemplary embodiment includes an "and/or" linkage between a first feature and a second feature, this should be read in such a way that the exemplary embodiment according to one specific embodiment has both the first feature and the second feature and according to another specific embodiment it has either only the first feature or only the second feature.

What is claimed is:

1. A method for ascertaining a state of a vehicle light of a vehicle, the method comprising the following steps:
    reading in an image signal that includes a camera image including a vehicle area of a detected vehicle; and
    evaluating the image signal using an artificial teachable model, at least two state categories, each representing a state of the vehicle light of the vehicle, being differentiated as an evaluation result, a state category of the at least two state categories being ascertained which represents an instantaneous state of the vehicle light of the vehicle;

wherein:
(a) the image signal that is read in has at least two image subsignals that each includes different pieces of color information, and the evaluating is carried out by using the at least two image subsignals; and/or
(b) the artificial teachable model is a fed back teachable model and the method further comprises reading in a detection signal representing that a detection of the vehicle is a first time detection of the vehicle, the fed back teachable model being placed into a predetermined state in response to the detection signal.

2. The method as recited in claim 1, wherein the artificial teachable model is an artificial neural network.

3. The method as recited in claim 1, wherein in the evaluating step, at least two further state categories, each representing a state of a further vehicle light of the vehicle, are differentiated, as the evaluation result, a state category of the at least two further state categories being ascertained which represents an instantaneous state of the further vehicle light of the vehicle.

4. The method as recited in claim 1, wherein the image signal that is read in has the at least two image subsignals that each includes the different pieces of color information and the evaluating is carried out by using the at least two image subsignals.

5. The method as recited in claim 4, wherein each of the at least two image subsignals represents the vehicle area in a different spectral range.

6. The method as recited in claim 4, wherein the evaluating includes dividing the read in image signal into different image areas that correspond to different respective subareas of the detected vehicle.

7. The method as recited in claim 1, wherein the artificial teachable model is the fed back teachable model.

8. The method as recited in claim 7, wherein the fed back teachable model is a fed back neural network.

9. The method as recited in claim 7, wherein the method comprises the reading in of the detection signal representing that the detection of the vehicle is the first-time detection of the vehicle, and the fed back teachable model is put into the predetermined state in response to the detection signal.

10. The method as recited in claim 1, wherein the camera image including a vehicle area of a further detected vehicle, and in the evaluating step, at least two further state categories, each representing a state of a vehicle light of the further vehicle are differentiated, as the evaluation result, the state category of the at least two further state categories being ascertained which represents an instantaneous state of the vehicle light of the further vehicle.

11. The method as recited in claim 10, wherein the evaluating step is carried out using a further artificial teachable model.

12. The method as recited in claim 10, wherein the evaluating step is carried out using a further artificial neural network.

13. The method as recited in claim 1, wherein the evaluation result is ascertained in the evaluating step by using a function argumentum maximi.

14. The method as recited in claim 1, further comprising the following step:
outputting an evaluation signal which represents the evaluation result, the evaluation signal being output as a visual signal and/or an audible signal.

15. A method for teaching an artificial teachable model to evaluate an image signal, the method comprising the following steps:
reading in an image signal that includes a camera image including a vehicle area of a detected vehicle, and a target signal representing a state category of a vehicle light of the vehicle that corresponds to a state of the vehicle light displayed in the image signal; and
training the artificial teachable model in such a way that the artificial teachable model detects the state category as a response to the image signal;
wherein the training is performed such that the detection is performed by:
(a) evaluating at least two image subsignals of the image signal that each includes different pieces of color information; and/or
(b) reading in a detection signal representing that a detection of the detected vehicle is a first time detection of the detected vehicle and placing the artificial teachable model into a predetermined state in response to the detection signal, the artificial teachable model being a fed back teachable model.

16. The method as recited in claim 15, wherein the artificial teachable model is an artificial neural network.

17. A device comprising a processor that it programmed to ascertain a state of a vehicle light of a vehicle by performing a method that includes:
reading in an image signal that includes a camera image including a vehicle area of a detected vehicle; and
evaluating the image signal using an artificial teachable model, at least two state categories, each representing a state of the vehicle light of the vehicle, being differentiated as an evaluation result, a state category of the at least two state categories being ascertained which represents an instantaneous state of the vehicle light of the vehicle;
wherein:
(a) the image signal that is read in has at least two image subsignals that each includes different pieces of color information, and the evaluating is carried out by using the at least two image subsignals; and/or
(b) the artificial teachable model is a fed back teachable model and the method further comprises reading in a detection signal representing that a detection of the vehicle is a first time detection of the vehicle, the fed back teachable model being placed into a predetermined state in response to the detection signal.

18. A device comprising a processor that is programmed to teach an artificial teachable model to evaluate an image signal by:
reading in an image signal that includes a camera image including a vehicle area of a detected vehicle, and a target signal representing a state category of a vehicle light of the vehicle that corresponds to a state of the vehicle light displayed in the image signal; and
training the artificial teachable model in such a way that the artificial teachable model detects the state category as a response to the image signal;
wherein the training is performed such that the detection is performed by:
(a) evaluating at least two image sub signals of the image signal that each includes different pieces of color information; and/or
(b) reading in a detection signal representing that a detection of the detected vehicle is a first time detection of the detected vehicle and placing the artificial teachable model into a predetermined state in response to the detection signal, the artificial teachable model being a fed back teachable model.

19. A non-transitory machine-readable memory medium on which is stored a computer program that is executable by a processor and that, when executed by the processor, causes the processor to perform a method for ascertaining a state of a vehicle light of a vehicle, the method comprising:
- reading in an image signal that includes a camera image including a vehicle area of a detected vehicle; and
- evaluating the image signal using an artificial teachable model, at least two state categories, each representing a state of the vehicle light of the vehicle, being differentiated as an evaluation result, a state category of the at least two state categories being ascertained which represents an instantaneous state of the vehicle light of the vehicle;

wherein:
- (a) the image signal that is read in has at least two image subsignals that each includes different pieces of color information, and the evaluating is carried out by using the at least two image subsignals; and/or
- (b) the artificial teachable model is a fed back teachable model and the method further comprises reading in a detection signal representing that a detection of the vehicle is a first time detection of the vehicle, the fed back teachable model being placed into a predetermined state in response to the detection signal.

* * * * *